United States Patent Office 2,947,693
Patented Aug. 2, 1960

2,947,693

OIL COMPOSITIONS CONTAINING METAL SALTS OF RICINOLEATE DITHIOPHOSPHORIC ACIDS

James M. Boyle, Bayonne, and Charles S. Lynch, Plainfield, N.J., and Harold R. Ready, Decatur, Ill., assignors to Esso Research and Engineering Company, a corporation of Delaware No Drawing. Original application Feb. 9, 1955, Ser. No. 487,212, now Patent No. 2,895,973, dated July 21, 1959. Divided and this application Apr. 17, 1959, Ser. No. 807,026

8 Claims. (Cl. 252—32.7)

This invention relates to a new class of chemical compounds, to methods of preparing such compounds and to lubricating oil compositions containing such compounds as useful additives. More particularly, the invention relates to metal salts of ricinoleate dithiophosphoric acids.

This application is a division of Serial No. 487,212, filed February 9, 1955, now U.S. Patent No. 2,895,973.

The utilization of additives in lubricating oil compositions is well known. These additives are used to improve one or more characteristics of the lubricating oil compositions such as viscosity index, pour point, wear resistance, oxidation resistance, corrosion resistance, extreme pressure resistance detergency, and the like, and are employed extensively in lubricating oil compositions for internal combustion engines such as automotive and aviation engines. Due to the increasing severity of engine operation, there is a continuing and critical need for new and improved additives which are capable of imparting improved characteristics to the lubricating oil compositions. Preferably, such new additives will improve more than one characteristic or property of the oil.

A new class of compounds has now been found which are exceedingly useful as additives for lubricating oil compositions. These new compounds of this invention are effective multi-purpose lubricating oil additives imparting properties of detergency, wear resistance and extreme pressure resistance to the lubricating oil compositions containing them. Such compositions are particularly useful for lubricating internal combustion engines. The compounds of this invention have the general formula $$\left[ \begin{matrix} R_1OOCR_3O \\ R_2OOCR_4O \end{matrix} \hspace{-4pt} \diagdown \hspace{-10pt} P\hspace{-4pt}\diagup\hspace{-4pt}\overset{\displaystyle S}{\underset{\displaystyle \|}{}}\hspace{-2pt}-S- \right] M$$

where $R_1O$— and $R_2O$— are residues of aliphatic monohydric alcohols, —$OCR_3O$— and —$OCR_4O$— are residues of aliphatic monohydroxy monocarboxylic acids selected from the group consisting of ricinoleic acid and condensation polymers thereof, and M is an alkaline earth metal or zinc. In the preparation of these compounds, the hydroxyl group of the aliphatic monohydric alcohol is reacted with the carboxylic group of the aliphatic monohydroxy monocarboxylic acid with the elimination of water to form an ester linkage. The hydroxyl group of the resultant ester, which is attributable to the aliphatic monohydroxy monocarboxylic acid is reacted with phosphorus pentasulfide with the evolution of hydrogen sulfide. The resultant bis-ester dithiophosphoric acid is neutralized with a basic reacting compound of an alkaline earth metal to form the dithiophosphates of this invention.

The aliphatic monohydroxy monocarboxylic acids useful in this invention are ricinoleic acid and condensation polymers thereof. Ricinoleic acid has the general formula

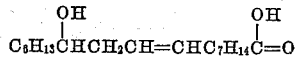

Condensation polymers of ricinoleic acid may also be employed in forming the esters of this invention. These condensation polymers are formed by reacting the carboxylic group of one molecule with the hydroxyl group of another molecule with the elimination of water by a self-esterification reaction. Thus, from 2 up to 6 or more molecules, preferably about 2 to 4 molecules, of ricinoleic acid may be combined to form a condensation polymer containing one free carboxylic acid group and one free hydroxyl group. Thus, for example, di-, tri-, tetra-, penta-, and hexa-ricinoleic acid may be formed. The condensation reaction may be carried out simply by heating ricinoleic acid at a temperature above about 210° F. as is well known in the art. This reaction generally forms a mixture of polyricinoleic acids. Such mixtures may be employed in this invention. These condensation polymers may then be esterified to form esters useful in this invention.

The aliphatic monohydric alcohols useful in this invention generally contain in the range of about 1 to 20 carbon atoms. The number of carbon atoms in the alcohol is not too critical and generally the use of relatively inexpensive alcohols is preferred. Particularly desirable alcohols have the formula ROH where R is an alkyl radical containing in the range of about 1 to 20 carbon atoms. Specific examples of the alcohols which may be employed in the present invention include methyl, ethyl, propyl, isopropyl, butyl, amyl, octyl, decyl, dodecyl, and octadecyl. Oxo alcohols prepared by the well-known "Oxo" process such as $C_7$ Oxo alcohol, $C_8$ Oxo alcohol, $C_{10}$ Oxo alcohol and $C_{13}$ Oxo alcohol may also be employed if desired.

The dithiophosphates of this invention are prepared in the following manner. An aliphatic monohydric alcohol (or a mixture of different aliphatic monohydric alcohols) of this invention is esterified with an aliphatic monohydroxy monocarboxylic acid (or mixtures of different aliphatic monohydroxy monocarboxylic acids) of this invention. Generally, about 1 mole of the aliphatic monohydric alcohol will be employed per mole of monohydroxy monocarboxylic acid. This esterification is carried out employing conventional esterification conditions well known to the art. A water entrainer such as benzene and an esterification catalyst such as sodium acid sulfate may be employed if desired and esterification temperatures in the range of about 180° F. to 300° F. are preferred. The completion of the esterification reaction will be indicated by the cessation of water formation which generally occurs after about 2 to 5 hours.

Then about 4 moles of the ester (or ester mixture) formed as described above is reacted with about 1 mole of phosphorus pentasulfide ($P_2S_5$). This reaction is preferably carried out at a temperature in the range of about 150° to 250° F. until evolution of hydrogen sulfide therefrom essentially ceases, which generally occurs after about 1 to 5 hours. Any unreacted phosphorus pentasulfide may be filtered from the remainder of the reaction mixture.

The resultant dithiophosphoric acid is then neutralized with a basic reacting compound of an alkaline earth metal or zinc. Generally about 2 moles of the dithiophosphoric acid will be employed per mole of the basic reacting compound of the metal. If desired, mixtures of different basic reacting compounds of different metals may be employed. Examples of basic reacting compounds which may be employed include the oxides, hydroxides and carbonates of the metals: zinc, barium, calcium, strontium and magnesium. Zinc is the preferred metal in the present invention. Any water formed in the neutralization reaction may be azeotroped off from the reaction mixture with a water entrainer such as benzene. The resultant dithiophosphate may be blended into a solvent such a mineral lubricating oil to form an additive concentrate.

Particularly preferred compounds of the present invention have the general formula

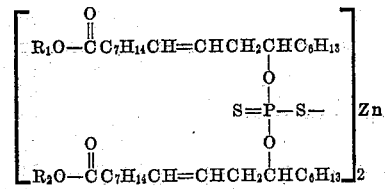

where $R_1$ and $R_2$ are alkyl radicals containing in the range of about 1 to 20 carbon atoms. A particularly preferred compound of this type is one in which both $R_1$ and $R_2$ are methyl groups derived from methyl alcohol.

In certain instances it may be desirable to use as lubricating oil additives dithiophosphates prepared by reacting a mixture of a ricinoleate ester and an aliphatic monohydric alcohol with $P_2S_5$ and neutralizing the resultant dithiophosphoric acid with a basic reacting compound of an alkaline earth metal. Mixed dithiophosphates prepared as above would have the general formula:

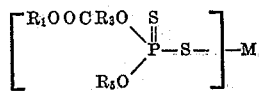

where $R_1OOCR_3O$— is the residue of the ricinoleate ester and $R_5O$— is the residue of the aliphatic monohydric alcohol. The alcohol, $R_5OH$, from which $R_5O$— is derived can contain in the range of about 1 to 20 carbon atoms. Preferably $R_5$ is an alkyl radical containing 1 to 20 carbon atoms, preferably 3 to 8 carbon atoms. Examples of such alcohols ($R_5OH$) would be the same as disclosed heretofore for the alcohols useful in preparing the ricinoleate esters.

The invention will be more fully understood by reference to the following example. It is pointed out, however, that the example is given for the purpose of illustration only and is not to be construed as limiting the scope of the present invention in any way.

EXAMPLE

*Preparation of zinc bis-(methyl ricinoleate) dithiophosphate*

A compound of this invention, namely, zinc bis-(methyl ricinoleate) dithiophosphate was prepared in the following manner: A mixture of 4.3 moles methyl ricinoleate and 1 mole of phosphorus pentasulfide was heated at 200–220° F. for 90 minutes. The small amount of unreacted phosphorus pentasulfide was removed by filtration. An equal weight of mineral oil having a viscosity at 100° F. of 100 S.U.S. was added to the product. This concentrate was then heated at 200–250° F. over 1 hour with 1.1 moles of zinc oxide. Benzene was introduced to azeotrope the residual water. Filtration of the excess base gave a pale yellow concentrate having the following properties:

Viscosity @ 210° F., S.U.S. _____ 52.3
Viscosity index _____ 130
Zinc, percent _____ 1.7
Sulfur, percent _____ 3.7

The oil concentrate consisting of 50% by weight of zinc bis-(methyl ricinoleate) dithiophosphate and 50% of the diluent mineral lubricating oil will hereinafter be termed additive A.

*Detergency properties of additive A in lubricating oil compositions*

Additive A was evaluated as a lubricating oil detergent in a phorone-$H_2SO_4$ test in accordance with the procedure set forth in Serial No. 327,516, now U.S. 2,732,285, by Elmer B. Cyphers and Charles S. Lynch. This particular laboratory test has been found to give an excellent correlation with the performances of lubricating oil compositions in diesel engines, particularly with respect to caterpillar ring zone deposits. The base oil, hereinafter referred to as base oil I, employed in this test consisted of (1) 95 vol. percent of a solvent refined mineral lubricating oil having an S.U.S. viscosity at 210° F. of about 66 seconds and a viscosity index of 103 and (2) 5 vol. percent of a conventional detergent additive hereinafter referred to as additive B. This conventional detergent additive, additive B, consisted of (1) about 62.5% by weight of an oil solution containing as the active ingredient 40% by weight of a $P_2S_5$-treated barium diisobutyl phenol sulfide and (2) about 37.5% of an oil solution containing as the active ingredient about 30% by weight of a calcium alkyl benzene sulfonate. Base oil I and a blend of base oil I and additive A were each evaluated in the phorone-$H_2SO_4$ test and the following results were obtained:

TABLE I.—PHORONE TEST RESULTS

| Compositions Evaluated [1] | Phorone No. (cc. of 10% $H_2SO_4$) | Type of Deposit |
|---|---|---|
| Base Oil I | 5.2 | Hard |
| Base Oil I + 1 wt. percent of Additive A | 5.6 | Soft |

[1] Additive concentration expressed on total composition.

In the phorone test the greater the amount of 10% $H_2SO_4$ which can be added to the lubricating oil composition, the better is the lubricating oil composition from a detergency standpoint. It will be noted that the oil composition containing 1 wt. percent of additive A (or 0.5% by weight of zinc di-(methyl ricinoleate) dithiophosphate) showed a substantially superior performance in the phorone test. More specifically, 5.6 ccs. of 10% $H_2SO_4$ could be added to the base oil containing additive A, whereas only 5.2 ccs. of 10% $H_2SO_4$ could be added to the base oil alone. The difference of 0.4 cc. represents a substantial difference in the phorone test since when 5.6 ccs. of 10% $H_2SO_4$ are added to base oil I, more than fifty times more hard resinous decomposition products (phorone deposits) are formed than when utilizing only 5.2 ccs. of $H_2SO_4$. It will also be noted that a hard type of deposit was formed when utilizing base oil I, whereas when using base oil I containing a small amount of additive A, a soft type of deposit was formed.

*Extreme pressure and wear resistance properties of additive A in lubricating oil compositions*

The extreme pressure and anti-wear properties of zinc bis-(methyl ricinoleate) dithiophosphate were measured by the Shell 4-ball E.P. tester. Results from this test are significant in that they correlate with valve train wear data from automotive field tests. Briefly, the Shell 4-ball E.P. test is carried out as follows: Three ½-inch diameter steel balls are rigidly clamped in a reservoir containing the test oil. A measured load is applied through a fourth ball which rotates at 1500 r.p.m. in contact with the other 3. The highest load at which the 3 fixed balls show no noticeable wear after 10 seconds is a measure of the film strength of the lubricant. The base oil, hereinafter referred to as base oil II, employed in this test consisted of (1) 82.6 vol. percent of a solvent refined mineral lubricating oil having an S.U.S. viscosity at 100° F. of about 100 and a viscosity index of about 105, (2) 16.2 vol. percent of a viscosity index improver concentrate containing as the active ingredient about 20% by weight of a polyisobutylene of 18,000 molecular weight, and (3) about 1.2 vol. percent of a viscosity index improver concentrate containing as the active ingredient about 45% of a polymethacrylate ester of $C_9$ alcohols. Base oil II alone and blends of base oil II containing additive A, additive B and a mixture of additives A and B were evaluated in the Shell 4-ball E.P. tester and the following results were obtained:

TABLE II.—SHELL 4-BALL E.P. TESTER RESULTS

| Composition Evaluated [1] | Seizure Load, kg. |
|---|---|
| Base Oil II | 60 |
| Base Oil II + 6 wt. percent of Additive A | 90 |
| Base Oil II + 6 wt. percent of Additive B | 70 |
| Base Oil II + 1 wt. percent of Additive A + 5 wt. percent of Additive B | 85 |

[1] Additive concentration based on total composition.

In the Shell 4-ball E.P. test, the higher the seizure load the better is the lubricating oil composition from an anti-wear standpoint. It will be noted that the addition of 6 wt. percent of additive B to base oil II gave only a slight improvement in this test. On the other hand, the addition of 6 wt. percent of additive A (3 wt. percent of zinc di-(methyl riconoleate)dithiophosphate) to base oil II increased the seizure load in the test by 30 points. Lubricating oil compositions giving seizure loads above 80 are outstanding in this test. It will also be noted that the addition of 1% by weight of additive A and 5% by weight of additive B to base oil II produced a seizure load of 85 whereas the result attributable to this particular combination of additive A and additive B based upon the additive effects of these two additives would predict a seizure load of less than 80.

Generally speaking, the lubricating oil compositions of this invention comprise a major proportion of a lubricating oil and a small amount of the novel compound (or mixtures of compounds) of this invention. Preferred concentrations of the dithiophosphates of this invention are in the range of about 0.01 to 10% by weight and even more preferably in the range of about 0.1 to 5% by weight, based on the total lubricating oil composition. In certain instances, a greater or lesser proportion may be employed if desired. In general, it is preferred to market the dithiophosphates of the present invention as additive concentrates containing about 10 to 75 wt. percent of the dithiophosphate, based on the additive concentrate. The remainder of the additive concentrate is generally a diluent oil, preferably a mineral lubricating oil.

The lubricating oil base stocks used in the compositions of this invention may be straight mineral lubricating oils or distillates derived from paraffinic, naphthenic, asphaltic or mixed base crudes, or if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloroethyl ether, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also for special applications various organic esters or animal, vegetable or fish oils or their hydrogenated, polymerized or voltolized products may be employed, either alone or in admixture with mineral oils.

Synthetic lubricating oils having a viscosity of at least 30 S.S.U. at 100° F. may also be employed such as esters of monobasic acids (e.g. ester of $C_8$ Oxo alcohol with $C_8$ Oxo acid, ester of $C_{13}$ Oxo alcohol with octanoic acid, etc.), esters of dibasic acids (e.g. di-2-ethyl hexyl sebacate, di-nonyl adipate, etc.), esters of glycols (e.g. $C_{13}$ Oxo acid diester of tetraethylene glycol, etc.), complex esters (e.g. the complex ester formed by reacting one mole of sebacic acid with two moles of tetraethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ Oxo alcohol, and one mole of $C_8$ Oxo acid), esters of phosphoric acid (e.g. the ester formed by contacting three moles of the mono methyl ether of ethylene glycol with one mole of phosphorus oxychloride, etc.), halocarbon oils (e.g. the polymer of chlorotrifluoroethylene containing twelve recurring units of chlorotrifluoroethylene), alkyl silicates (e.g. methyl polysiloxanes, ethyl polysiloxanes, methyl-phenyl polysiloxanes, ethyl-phenyl polysiloxanes, etc.), sulfite esters (e.g. ester formed by reacting one mole of sulfur oxychloride with two moles of the methyl ether of ethylene glycol, etc.), carbonates (e.g. the carbonate formed by reacting $C_8$ Oxo alcohol with ethyl carbonate to form a half ester and reacting this half ester with tetraethylene glycol), mercaptans (e.g. the mercaptal formed by reacting 2-ethyl hexyl mercaptan with formaldehyde), formals (e.g. the formal formed by reacting $C_{13}$ Oxo alcohol with formaldehyde), polyglycol type synthetic oils (e.g. the compound formed by condensing butyl alcohol with fourteen units of propylene oxide, etc.), or mixtures of any of the above in any proportions. Also mixtures of mineral oils and the aforementioned synthetic oils may be utilized if desired.

For the best results the base stock chosen should normally be that oil which without the new addition agents present gives the optimum performance in the service contemplated. However, since one advantage of the agents is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the addition agent, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel service, particularly with high speed diesel engines, and in aviation engine and other gasoline engine service, oils of higher viscosity index are often preferred, for example, up to 75 to 100, or even higher viscosity index.

In addition to the compounds to be added according to the present invention, other agents may also be used. One of the more important additive materials to be used with the base stock of the present invention is a viscosity index improver. The finished lubricating oil for automotive use should have a high viscosity index. A preferred viscosity index improver as well as thickening agent is a high molecular weight polymerized olefin, such as polymerized $C_3$ to $C_5$ olefins. For example polymerized butenes and preferably polymerized isobutene having a molecular weight in the range of about 5,000 to 50,000, preferably about 10,000 to 25,000, and even more preferably about 15,000 to 20,000, are useful.

These additives are especially suitable for increasing the viscosity of the light neutral oils and other light distillates. For example, oils having S.U.S. viscosities below about 40 at 210° F. may be increased to higher viscosity oils such as those having viscosities above about 45 S.U.S. at 210° F., by the use of these V.I. thickening agents. In order to increase viscosity and to improve viscosity index of the finished lubricant by as much as 10 to 70 units, it is generally desired to employ in the range of about 0.1 to 10.0 wt. percent, preferably 1 to 5%, and even more preferably about 2 to 4%, of the polyolefin based on the finished lubricating oil. Other viscosity index improvers include the polymethacrylate esters, fumarate-vinyl acetate copolymers, polyalkylstyrenes, and the like. Finished lubricants containing a mixture of polyolefins and polyesters may be formulated. Thus from 3 to 10% of polybutene and 1 to 3% of a polyester may be used.

In addition to the dithiophosphates of this invention which act as detergent additives, it will be understood that other detergent additives may be employed in combination therewith. Particularly preferred detergents which may be employed in combination with the dithiophosphates of this invention include metal alkyl phenol sulfides, phosphosulfurized metal alkyl phenol sulfides, metal sulfonates and mixtures thereof. Specific examples of metal alkyl phenol sulfides which may be employed include barium tert. octyl phenol sulfide, calcium tert. octyl phenol sulfide, calcium-barium tert. octyl phenol sulfide, calcium nonyl phenol sulfide, barium nonyl phenol sulfide, calcium-barium amyl phenol sulfide and the like. Alkaline earth metal alkyl phenol sulfides are particularly preferred. Preferably the metal alkyl phenol sulfides contain one alkyl group containing in the range of about 4 to 24 carbon atoms attached to each benzene nuclei. The reaction products of phosphorus pentasulfide with any of the above metal alkyl phenol sulfides are also especially preferred detergent additives useful in lubricating oil compositions of the present invention. Another preferred type of detergent additive are the metal sulfonates, particularly alkaline earth metal sulfonates. Specific examples of these include barium petroleum sulfonate, calcium petroleum sulfonate and calcium-barium petroleum sulfonate. Mixtures of any of the above-mentioned detergents may also be employed as well as other detergent additives such as phosphosulfurized hydrocarbons, for example $P_2S_5$-treated polyisobutylene. Generally these detergent additives (other than the dithiophosphates of the present invention) will be used in concentrations of about 0.1 to 10%, preferably about 0.5 to 5% by weight, based on the total composition.

In addition to the materials mentioned above, the lubricating oil compositions may also include other additives such as dyes, pour depressors, anti-oxidants, solvents, assisting agents and the like. Specific examples of such other compounds include chlordibenzyl disulfide, sulfurized sperm oil, voltolized sperm oil, phenyl alpha-naphthylamine, diamyl trisulfide, sulfurized wax olefins, tricresyl phosphate, and 2,6-di-tert. butyl-4-methyl phenol. Solvents and assisting agents, such as esters, ketones, alcohols, thioalcohols, amines, aldehydes, halogenated or nitrated compounds, and the like, may also be employed.

In addition to being employed as lubricants, the additives of the present invention may also be used in other mineral oil products such as motor fuels, hydraulic fluids, torque converter fluids, cutting oils, flushing oils, transformer oils, industrial oils, process oils and the like and generally as useful additives in oleaginous products. They may also be used in gear lubricants, greases and other products containing lubricating oils as ingredients.

What is claimed is:

1. A lubricating oil composition comprising a major proportion of lubricating oil and about 0.01 to 10% by weight of a compound of the formula

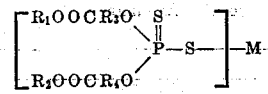

where $R_1$ and $R_2$ are alkyl radicals containing 1 to 20 carbon atoms, —$OCR_3O$— and —$OCR_4O$— are residues of aliphatic monohydroxy monocarboxylic acids selected from the group consisting of ricinoleic acid and condensation polymers thereof having in the range of 2 to 6 ricinoleic groups per molecule, and M is a metal selected from the group consisting of alkaline earth metals and zinc.

2. A lubricating oil composition according to claim 1 wherein said oil is a mineral lubricating oil.

3. A lubricating oil composition according to claim 1 wherein said acid is ricinoleic acid.

4. A lubricating oil composition according to claim 1 wherein said metal is zinc.

5. A mineral lubricating oil composition comprising a major amount of mineral lubricating oil and about 0.1 to 10.0% by weight based on the weight of said total composition of a compound of the formula

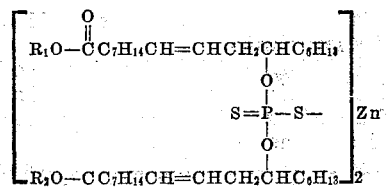

where $R_1$ and $R_2$ are alkyl radicals containing in the range of about 1 to 20 carbon atoms.

6. A lubricating oil composition according to claim 5 wherein $R_1$ and $R_2$ are both methyl groups.

7. An additive concentrate consisting essentially of 10 to 75% by weight of zinc bis-(methyl ricinoleate) dithiophosphate and a mineral oil.

8. An additive concentrate consisting essentially of mineral oil and 10 to 75% by weight of a compound of the formula

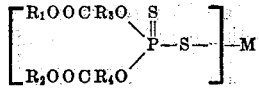

where $R_1$ and $R_2$ are alkyl radicals containing 1 to 20 carbon atoms, —$OCR_3O$— and —$OCR_4O$— are residues of aliphatic monohydroxy monocarboxylic acids selected from the group consisting of ricinoelic acid and condensation polymers thereof having in the range of 2 to 6 ricinoleic groups per molecule, and M is a metal selected from the group consisting of alkaline earth metals and zinc.

No references cited